United States Patent Office 3,078,577
Patented Feb. 26, 1963

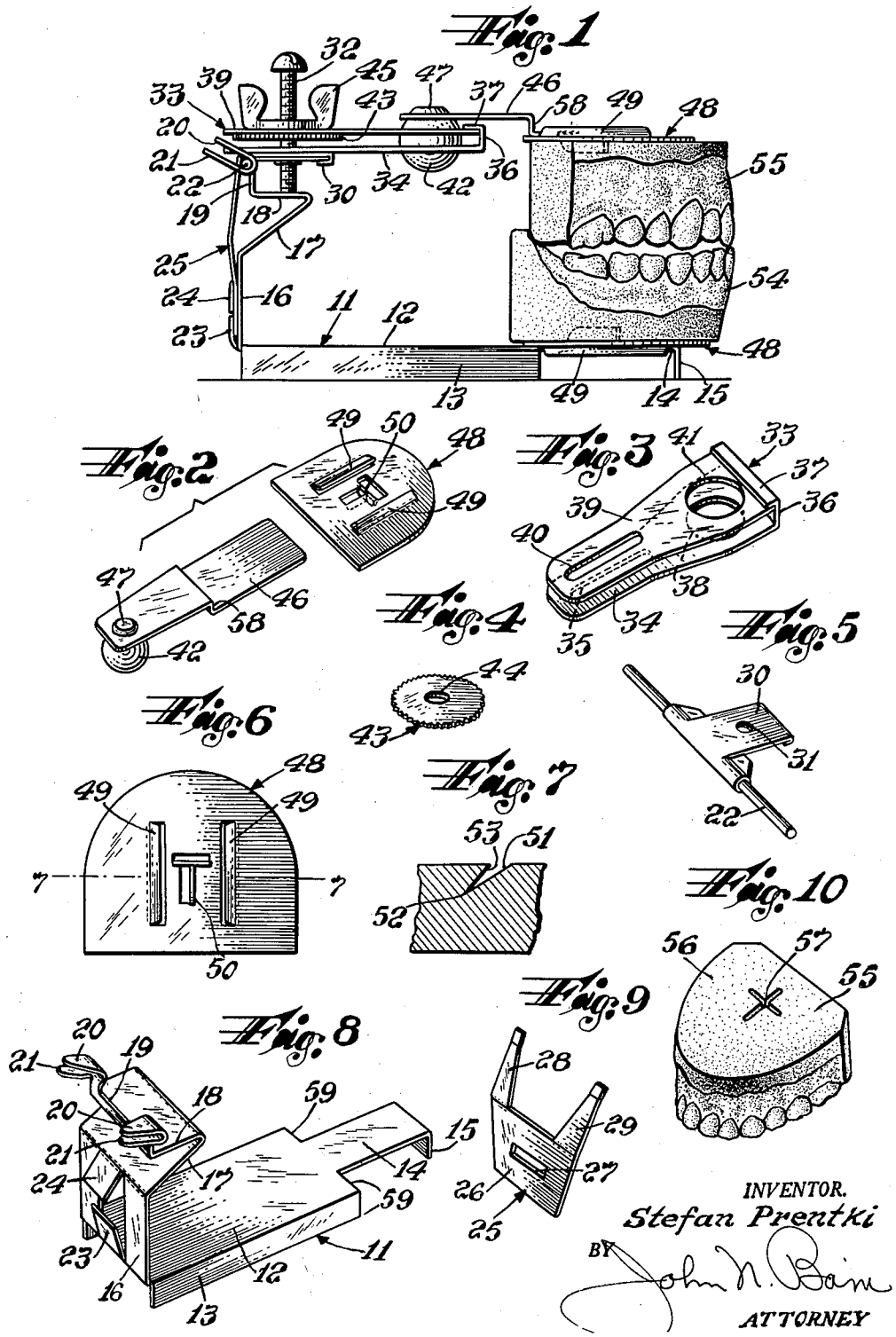

3,078,577
DENTAL ARTICULATOR
Stefan Prentki, 585 Elizabeth Ave., Newark, N.J.
Filed July 27, 1961, Ser. No. 127,319
8 Claims. (Cl. 32—32)

My invention relates to dental articulators generally and specifically to a dental articulator in which the plaster model of the jaw may be attached and detached from the articulator without employing plaster or other permanent bonding material and without disturbing the setting of the bite registration and further, in which the setting of the bite registration may be adjusted without detaching either jaw model from the articulator.

Presently known dental articulators employ at least one common expedient, the plaster jaw models are secured thereto by plaster. This procedure requires an inordinately long period of time to prepare the wet plaster, apply it to the jaw models and articulator, and permit it to thoroughly dry before work can be begun. In addition, those articulators in which the jaw models are plastered directly to integral parts of the articulator cannot be adjusted with respect to bite registration without first breaking the plaster bond between the articulator and the jaw model and thereafter replastering. Obviously, this procedure is not only time consuming but may also damage the plaster model beyond use thereby necessitating casting of new jaw models resulting in delays and inconvenience to the patient.

Another difficulty encountered in many dental articulators lies in the fact that the plaster jaw model cannot be removed from the articulator without destroying the previously set bite registration. This is particularly inconvenient to the technician working on the models since both the model and the cumbersome articulator must be handled at once.

Therefore, it is among the objects and advantages of my invention to provide a dental articulator in which the plaster jaw models may be easily attached and detached from the articulator without breaking a plaster or other permanent bond.

Another object of my invention is to provide a dental articulator in which the bite registration between the upper and lower jaw models may be adjusted without detaching either model from the articulator.

A further object of my invention is to provide a dental articulator in which either or both of the plaster jaw models may be detached from the articulator in order to facilitate work thereon.

Still another object of my invention is to provide a dental articulator in which the orientation of the upper jaw model with respect to the lower jaw model may be easily adjusted in any one or more of the three planes of space simultaneously.

Yet another object of my invention is to provide a dental articulator in which the jaw models need not be precisely molded, in order to attach them to the articulator.

Still a further object of my invention is to provide a dental articulator in which each jaw model is detachably secured to a mounting plate by some suitable pressure sensitive adhesive, the mounting plate being slidably and detachably secured to arms of the articulator.

Another object of my invention is to provide a dental articulator which may be easily fabricated from inexpensive, readily available, and durable parts and materials.

These objects and advantages as well as other objects and advantages may be achieved by my invention one embodiment of which is illustrated in the drawings in which FIGURE 1 is a side elevational view of my articulator with jaw models mounted thereon.

FIGURE 2 is an exploded view of the upper arm of the articulator and a detachable mounting plate.

FIGURE 3 is a view in perspective of an adjustable ball joint socket.

FIGURE 4 is a view in perspective of a locking disc.

FIGURE 5 is a view in perspective of a pivotal mounting for the upper arm and ball joint socket.

FIGURE 6 is a top plan view of a jaw model mounting plate.

FIGURE 7 is a partial, cross-sectional view of the jaw model mounting plate taken along line 7—7 in FIGURE 6.

FIGURE 8 is a view in perspective of the base of the articulator.

FIGURE 9 is a view in perspective of a bifurcated resilient retainer.

FIGURE 10 is a view in perspective of a plaster jaw model.

Referring now to the drawings in detail, my dental articulator comprises a base member 11 having a flat, horizontal platform 12. The platform 12 is provided with a generally vertical, depending flange 13, 13 on each side. At one end of the platform 12 is an integral, relatively narrow, flat mounting arm 14. The end of the mounting arm 14 is provided with a generally vertical depending flange 15. The flanges 13, 13 and 15 are of the same height and function as legs for the base 11.

An integral, generally vertical, upwardly extending rear wall 16 is formed on the end of the platform 12 opposite the mounting arm 14. The wall 16 is bent forwardly at an oblique angle and then rearwardly at an acute angle to define respectively an inclined portion 17 and a horizontal step 18. The rearward portion of the step 18 is deformed upwardly to define a relatively short vertical wall 19. A generally U-shaped shaft-mounting bracket 20 is formed integrally on the top of the wall 19 on its opposite sides. Each bracket 20 defines a channel 21 which may be inclined upwardly at a slight angle. The central portion of the wall 19 is recessed between the brackets 20, 20.

A shaft 22 is pivotally seated within the channels 21, 21 defined by brackets 20, 20. The rear wall 16 of the base member 11 is die-cut to provide a pair of deformable, mounting tabs 23, 24. A retainer 25 is mounted on the rearwall 16 by means of tabs 23, 24. The base 26 of the retainer 25 is provided with a generally horizontal slot 27. On the top of the base 26 on opposing sides thereof, there are formed integral, resilient legs 28, 29. The tab 24 passes through slot 27 in the base portion 26 and bent forwardly to press the retainer plate 25 against the rear wall 16. The tab 23 is bent upwardly over the bottom of the base member 26. In this manner, tabs 23 and 24 cooperatively secure the retainer plate 25 to the rear wall 16 of the base member 11. The legs 28, 29 of the retainer plate 25 extend upwardly and slightly forward to resiliently engage shaft 22 when it is seated in the channels 21, 21 defined by brackets 20, 20. In this manner, the shaft 22 is pivotally mounted to the base member 11. Of course, shaft 22 may be detached by merely pulling it outwardly against the pressure exerted by the resilient legs 28, 29.

Rigidly mounted on the shaft 22, at its center, is a flat plate 30. Plate 30 is provided with a threaded hole 31 near its center. An elongated bolt 32 is threadably engaged in hole 31. A ball joint socket 33 is mounted on the bolt 32 above the plate 30. The ball joint socket 33 comprises an elongated, flat lower member 34 having an elongated slot 35 at one end through which bolt 32 loosely passes. The opposite end of the lower member 34 is deformed upwardly to provide an end wall 36. The top of the end wall 36 is deformed, rearwardly to define a flange 37. A hole 38 is provided in the lower member 34 intermediate to the slot 35 and the end wall 36. An elongated, flat upper member 39 is provided with an elongated slot 40 and a hole 41 oriented to oppose respectively slot 35 and hole 38 in the lower member 34. The bolt 32 extends loosely through the slots 40 and 35 and the forward end of the upper member 39 is seated under the flange 37 on the lower member 34. A ball 42 is seated in the holes 38 and 41 between the lower member 34 and upper member 39. The diameter of the holes 38, 41 is smaller than the diameter of the ball 42 so that a portion of the ball extends above the upper member 39 and below the lower member 34. The upper member 39 is fabricated of a rigid material such that when it is forced downwardly against the lower member 34 it forces the ball 42 into tight engagement with the periphery of the holes 41 and 38 thereby holding it immovable. Of course, when the upper member 39 is allowed to move upwardly, the ball 42 is free to turn in its socket. A locking disc 43 with an axial, threaded hole 44 is threadably engaged to the bolt 32 between the lower member 34 and upper member 39 of the ball joint socket 33. A wing nut 45 is threadably engaged to the bolt 32 above the upper member 39.

An upper arm 46 is rigidly secured to the top of the ball 42 by a rivet 47. Jaw model mounting plates 48, 48 are slidably engaged to both the upper arm 46 and lower arm 14. One surface of the mounting plate 48 is provided with a pair of opposed, parallel flanges 49, 49 extending inwardly toward each other at oblique angles. The opposite surface of the mounting plate 48 is provided with a T-shaped projection 50, perpendicular to the plane of the plate 48 and located between the flanges 49, 49. The mounting plate 48 may be die-cut and the cut portions deformed to define the flanges 49, 49 and projection 50. The flanges 49, 49 are separated by a distance equal to the width of the arms 14 and 46 which, for convenience, may be the same width. The arms 14 and 46 may slide between the flanges 49, 49 thereby slidably and detachably mounting plates 48, 48 to the said arms. The surface of the mounting plate 48 on the side of the projection 50 is provided with a plurality of wedge-shaped cuts 51 to facilitate mounting the jaw models on the plate. The bottommost tip 52 of the cut 51 displaced is laterally from the open portion of the cut at the surface of the plate. A pressure sensitive adhesive material coating the surface of the plate 48 fills the wedge-shaped cut 51 and is thus provided with an overhanging tip 53 to help maintain it in adhesive bonding relationship to the plate.

In operation, the plaster models 54, 55 of the jaw are cast in the usual fashion from plaster. The top 56 of each plaster model is ground flat but not to any particular angle with respect to the bite registration of the upper and lower jaws. The planed surface of each jaw model 54, 55 is cut to provide a generally T-shaped groove 57. The groove 57 should be oriented so that one leg is generally perpendicular to the front, center portion of the model and the other groove generally perpendicular thereto. The surface of a mounting plate 48 on the side of the T-shaped projection 50 and grooves 51 may be coated with a pressure sensitive adhesive. The plate 48 is then applied to the jaw model by pressing the T-shaped projection 50 into the T-shaped groove 57. In this manner, the plate 48 may be detachably secured to the jaw model with the T-shaped projection 50 cooperating with the T-shaped groove as a reference guide. Both jaw models 54, 55 are secured to mounting plates 48, 48 in this manner. The mounting plates 48, 48 are then slidably engaged to the arms 46, 14, the upper jaw model to the upper arm 46, and the lower jaw model to the lower arm 14. It should be noted that the upper arm 46 is provided with a step 58 against which the flanges 49, 49 abut to provide the upper plate with a fixed reference or base position. Similarly, the arm 14 being narrower than the base platform 12, the flanges 49, 49 will engage the laterally extending front edges 59, 59 of the platform 12.

The bite registration between the jaw models is adjusted in the following manner. The lower jaw model 54 is positioned with the flanges 49, 49 of the mounting plate 48 engaging the laterally extending forward edges 59, 59 of the platform 12. This is the base or reference position for the lower jaw model 54. The upper jaw model 55 is slidably engaged to the upper arm 46 until flanges 49, 49 abutt step 58. The upper jaw model 55 may be oriented in its vertical plane by screwing the bolt 32 downwardly through the plate 30 to engage the step 18. The bolt 32 is free to rotate in the plate 30 when both the locking disc 43 and wing nut 45 are free and unengaged to any other part. When wing nut 45 and locking disc 43 are so loosened, the ball joint socket 33 may be moved toward and away from the shaft 22 by means of slots 35 and 40. Similarly the ball joint socket 33 is free to rotate about the bolt 32. Still further, when the wing nut 45 is loosely disposed relative to the upper member 39 of the ball joint socket 33, the ball 42 is free to revolve in any plane in the holes 41 and 38. Thus, the upper jaw model 55 may be oriented in any one or more of the three planes of space to present a proper bite registration. When the proper bite registration has been set by the technician, the locking disc 43 is screwed downwardly on the bolt 32 to tightly engage the lower member 34 of the ball joint socket 33 to the plate 30. This prevents rotation of the ball joint socket 33 about the bolt 32 and further prevents rotation of the bolt 32 itself in the hole 31 in the plate 30. The ball 42 is then secured in place by turning the wing nut 45 in a clockwise direction to forceably engage the rigid upper member 39 bending it downwardly against its normal resilience. Since the front edge of the upper member 39 is seated under the flange 37, a moment force is applied to the ball 42 thereby binding it in place. This locks the bite registration of the upper jaw model 55 relative to the lower jaw model 54. The upper arm 46 and ball joint socket 33 may be rotated upwardly in a vertical plane about shaft 22 without disturbing the bite registration. If it is desirable to remove the jaw models 54, 55 entirely from the arms 46, 14, the mounting plates 48, are merely slid forwardly. Afterwards, the models 54, 55 may be reattached to the arms 46, 14 without disturbing the bite registration by merely sliding the mounting plates 48, inwardly until flanges 49, 49 on each plate 48, 48 engaged respectively step 58 on the upper arm 46 and edges 59, 59 on the platform 12.

The foregoing description is merely intended to illustrate an embodiment of the invention. The component parts have been shown and described. They each may have substitutes which may perform a substantially similar function; such substitutes may be known as proper substitutes for the said components and may have actually been known or invented before the present invention; these substitutes are contemplated as being within the scope of the appended claims, although they are not specifically catalogued herein.

What is claimed:
1. A dental articulator comprising a base,
a lower arm extending from one end of the base,
an upstanding wall at the opposite end of the base,
a ball joint socket pivotally mounted to the top of the wall, the socket being both rotatable about an axis and movable longitudinally with respect to said axis,
a ball movably mounted in the ball joint socket,
means for securing the ball joint socket against rotational and longitudinal movement,
means for securing the ball against movement in the socket,
an upper arm rigidly secured to the ball,
a first jaw model mounting plate slidably mounted on the upper arm the first mounting plate being detachable from the upper arm by sliding longitudinally therealong until it disengages therefrom at the end opposite the upstanding wall, and a second jaw model mounting plate slidably mounted on the lower arm the second mounting plate being detachable from the lower arm by sliding longitudinally therealong until it disengages therefrom at the end opposite the upstanding wall.

2. A dental articulator comprising, a base, a lower arm extending from one end of the base, an upstanding wall at the opposite end of the base, a shaft pivotally mounted at the top of the wall, a ball joint socket secured to the shaft, the socket being both rotatable about and longitudinally movable with respect to an axis lying in a plane generally perpendicular to the axis of the shaft, a ball movably mounted in the ball joint socket, an upper arm rigidly secured to the ball, means engaged to the ball joint socket to secure the socket against both rotational and longitudinal movement, means engaged with the ball joint socket to secure the ball against movement in the socket, a first mounting plate slidably mounted to the upper arm the first mounting plate being detachable from the upper arm by sliding longitudinally therealong until it disengages therefrom at the end opposite the upstanding wall, and a second mounting plate slidably mounted to the lower arm the second mounting plate being detachable from the lower arm by sliding longitudinally therealong until it disengages therefrom at the end opposite the upstanding wall.

3. A dental articulator comprising, a base, a lower arm extending from one end of the base, an upstanding wall at the opposite end of the base, a shaft pivotally mounted at the top of the wall, a ball joint socket secured to the shaft, the socket being both rotatable about and longitudinally movable with respect to an axis lying in a plane generally perpendicular to the axis of the shaft, a ball movably mounted in the ball joint socket, an upper arm rigidly secured to the ball, means engaged with the ball joint socket to secure it against both rotational and longitudinal movement, means engaged with the ball joint socket to secure the ball against movement in the socket, adjustable means engaged with the ball joint socket adapted to secure if against pivotal movement about the shaft, a first jaw model mounting plate slidably mounted to the upper arm the first jaw model mounting plate being detachable from the upper arm by sliding longitudinally therealong until it disengages therefrom at the end opposite the upstanding wall, a second jaw model mounting plate slidably mounted to the lower arm the second jaw model mounting plate being detachable from the lower arm by sliding longitudinally therealong until it disengages therefrom at the end opposite the upstanding wall, stop means on both the upper arm and lower arm adapted to engage the mounting plate slidably mounted thereon.

4. A dental articulator comprising, a base, a lower arm extending from one end of the base, an upstanding wall at the opposite end of the base, a step on the wall, a shaft pivotally mounted to the top of the wall, a plate rigidly secured to the shaft, the plate having a threaded hole, a threaded shaft engaged in the hole in the plate and adapted to engage the step on the wall, a ball joint socket loosely mounted on the threaded shaft above the plate, the socket being both rotatable about and longitudinally movable with respect to the threaded shaft, a ball movably mounted in the socket, means threadably engaged to the threaded shaft adapted to engage the socket to secure it against both rotational and longitudinal movement relative to the threaded shaft but permit movement of the ball within the socket, separate means engaged to the threaded shaft adapted to engage the socket to secure the ball against movement, an upper arm rigidly secured to the ball, a first jaw model mounting plate slidably mounted to the upper arm the first jaw model mounting plate being detachable from the upper arm by sliding longitudinally therealong until it disengages therefrom at the end opposite the upstanding wall, and a second jaw model mounting plate slidably mounted to the lower arm the second jaw model mounting plate being detachable from the lower arm by sliding longitudinally therealong until it disengages therefrom at the end opposite the upstanding wall.

5. A dental articulator comprising, a base, a lower arm extending from one end of the base, the lower arm provided with stop means, an upstanding wall at the opposite end of the base, a step on the wall, a shaft pivotally mounted to the top of the wall, a plate rigidly secured to the shaft, the plate having a threaded hole, a threaded shaft rotatably engaged in the hole in the plate and adapted to project both above the plate and beneath the plate to engage the step on the wall, an elongated lower member loosely mounted on the threaded shaft above the plate, the lower member having an elongated slot at one end through which the threaded shaft passes and a hole near the opposite end, an upturned end on the lower member, a rearwardly facing flange on the top of the upturned end, an upper member loosely mounted on the threaded shaft above the lower member, with one end engaged beneath the rearwardly facing flange on the lower member, the upper member having an elongated slot at one end through which the threaded shaft passes and a hole near the opposite end opposite the hole in the lower member, a ball having a diameter greater than the holes in the upper and lower members movably mounted therebetween, the ball partially projecting through said holes, first means threadably engaged to the threaded shaft and adapted to compress the lower member against the plate thereby securing it against both rotational and longitudinal movement relative to the threaded shaft, second means threadably engaged to the threaded shaft above the upper member adapted to force the upper member downwardly thereby securing the ball against movement, an upper arm rigidly secured to the ball, a jaw model mounting plate slidably and detachably mounted on the upper arm, a jaw model mounting plate slidably and detachably mounted on the lower arm, and stop means on both the upper arm and lower arm adapted to engage the jaw model mounting plate mounted thereon.

6. A dental articulator in accordance with claim 1 in which the jaw model mounting plate is provided with a projection adapted to seat within a cooperative recess in a jaw model.

7. In a dental articulator, a jaw model mounting plate comprising a generally flat plate, a pair of elongated parallel flanges inclined upwardly and inwardly toward each other on one face of the plate and a depending pair of intersecting projections on the opposite face of the plate.

8. In a dental articulator, a jaw model mounting plate in accordance with claim 7 in which the face of the plate having the projections is provided with a plurality of grooves, portions of which are undercut beneath the face of the plate.

References Cited in the file of this patent

UNITED STATES PATENTS

| | | |
|---|---|---|
| 565,326 | Bragg | Aug. 4, 1896 |
| 1,102,741 | Hardie | July 7, 1914 |
| 1,736,006 | Hagman | Nov. 19, 1929 |
| 2,119,896 | Van Dorn | June 7, 1938 |
| 2,535,146 | Lyons | Dec. 26, 1950 |
| 2,700,219 | Lindley | Jan. 25, 1955 |